US007065527B2

(12) United States Patent
McCartney et al.

(10) Patent No.: US 7,065,527 B2
(45) Date of Patent: Jun. 20, 2006

(54) SYSTEMS AND METHODS OF OPTIMIZING METADATA PUBLISHING SYSTEM UPDATES BY ALTERNATING DATABASES

(75) Inventors: Jason E. D. McCartney, Redmond, WA (US); T. Brian Springer, Jr., Redmond, WA (US); Keith M. Toussaint, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 425 days.

(21) Appl. No.: 10/180,443

(22) Filed: Jun. 26, 2002

(65) Prior Publication Data

US 2004/0003003 A1 Jan. 1, 2004

(51) Int. Cl.
*G06F 17/30* (2006.01)

(52) U.S. Cl. .......................................... 707/10; 707/203
(58) Field of Classification Search ..................... 707/9, 707/10, 203; 705/1
See application file for complete search history.

(56) References Cited

U.S. PATENT DOCUMENTS

| 5,170,480 A | 12/1992 | Mohan et al. |
| 5,606,693 A | 2/1997 | Nilsen et al. |
| 5,668,986 A | 9/1997 | Nilsen et al. |
| 6,345,256 B1 * | 2/2002 | Milsted et al. ................. 705/1 |
| 6,377,959 B1 | 4/2002 | Carlson |
| 6,393,434 B1 | 5/2002 | Huang et al. |
| 6,408,336 B1 * | 6/2002 | Schneider et al. .......... 709/229 |
| 6,760,721 B1 | 7/2004 | Chasen et al. |

2003/0093790 A1   5/2003   Logan et al.

OTHER PUBLICATIONS

Codd, E.F., "A Relational Model of Data for Large Shared Data Banks", Jun. 1970, Communications of the ACM, vol. 13, No. 6, pp. 377-387.*
Breitbart et al., "Replication and Consistency: Being Lazy Helps Sometimes," Proceedings of the sixteenth ACM SIGACT-SIGMOD-SIGART symposium on Principles of database systems, 1997, pp. 173-184, ACM Press, New York, U.S.A.
Gardarin et al., "A Reliable Distributed Control Algorithm for Updating Replicated Databases," Proceedings of the sixth communications symposium, 1997, pp. 42-51, ACM Press, New York, U.S.A.

* cited by examiner

*Primary Examiner*—Don Wong
*Assistant Examiner*—Brian Goddard
(74) *Attorney, Agent, or Firm*—Senniger Powers

(57) ABSTRACT

Systems and methods for data publishing. A back end server collects source data and generates a current publication database from the collected source data. The back end database server also copies the current publication database to an offline database. A front end server directs queries to an online database. After the current publication database is copied to the offline database, the front end server alternates the online and offline databases so that the offline database becomes online for data delivery and the online database becomes offline to prevent data delivery. An automation control database managed by the back end server contains job control data for instructing the front end server which of the associated databases is online and which of the associated databases is offline.

40 Claims, 5 Drawing Sheets

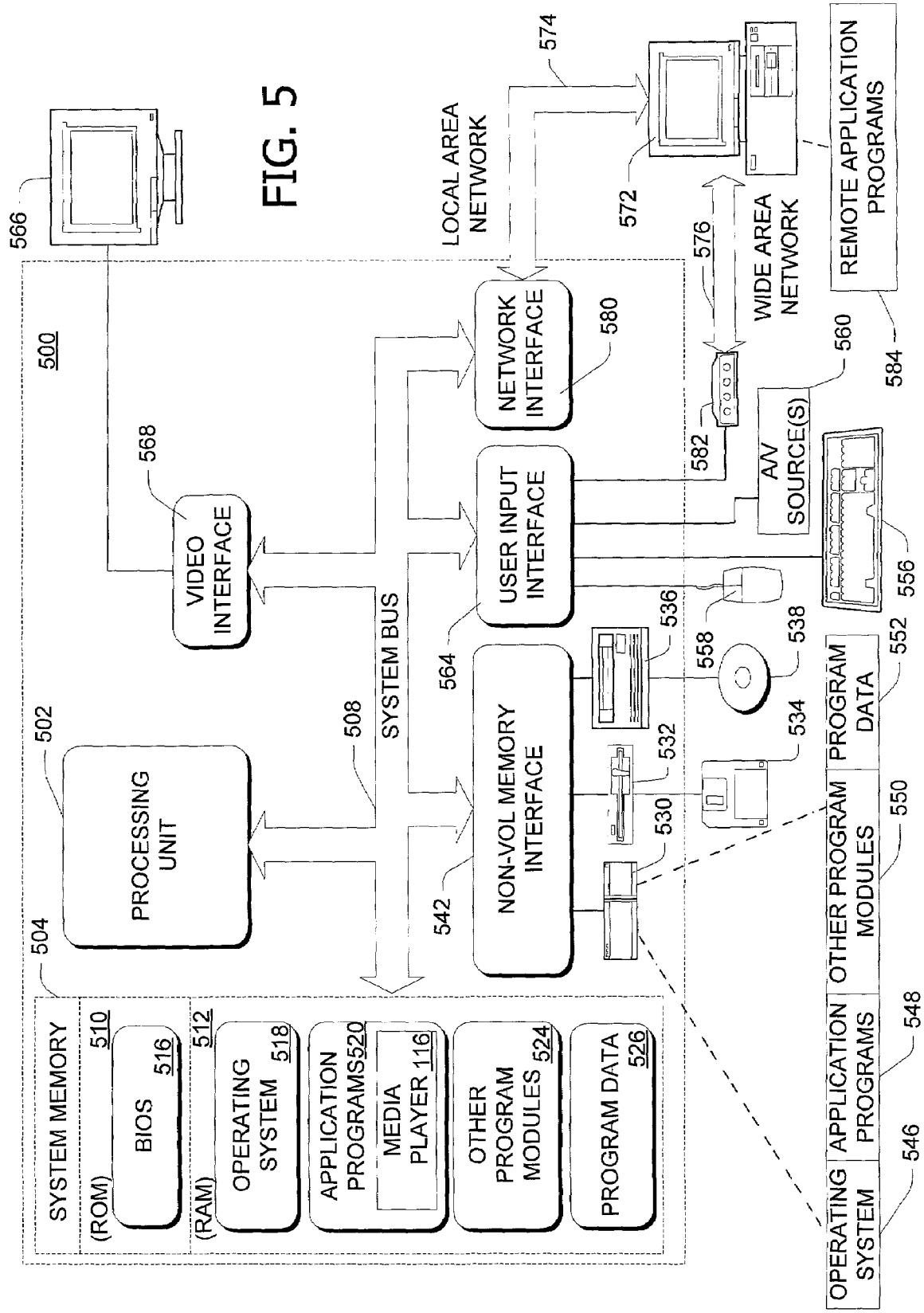

SYSTEMS AND METHODS OF OPTIMIZING METADATA PUBLISHING SYSTEM UPDATES BY ALTERNATING DATABASES

TECHNICAL FIELD

The present invention relates to the field of data publishing. In particular, this invention relates to publishing large database updates to frequently accessed databases in a production environment.

BACKGROUND OF THE INVENTION

Due to recent advances in technology, computer users are now able to enjoy many features that provide an improved user experience, such as playing various media and multimedia content on their personal or laptop computers. For example, most computers today are able to play compact discs (CDs) so users can listen to their favorite musical artists while working on their computers. Additionally, many computers are equipped with digital versatile disc (DVD) drives enabling users to watch movies.

As users become more familiar with advanced features on their computers, such as those mentioned above, their expectations of the various additional innovative features will undoubtedly continue to grow. Users often desire to receive media metadata, which includes content-related data associated with digital media files such as those from CDs and DVDs. For example, consider a media player software application that enables a user to play a CD on his or her computer. Typical applications allow the user to display track information associated with the CD by clicking on an appropriate user interface (UI). Such track information usually includes track numbers, song titles, playing times, and the like.

Given the large number and variety of media files already existing today, data publications of media metadata can be very large and experience a high volume of query traffic (e.g., several multi-gigabytes in size and under constant access). The size and activity level of any live data-driven service essentially precludes updating any significant portion of data by conventional means while the database is in use. As such, it is impossible to simply update the data while the database is "live" (i.e., being served to customers). Moreover, customers, particularly in a global environment, desire access to current, real-time metadata about media with 100%, around-the-clock availability. Under these circumstances, web services providing media metadata, for example, cannot afford any downtime for updating their data publications.

Conventional methods for updating databases are unable to provide timely, current data to users. One known method requires maintaining a snapshot of a web page and delivering data from the snapshot rather than going against the database. In this instance, currency of data is at issue because static content generated earlier is being served. Pre-caching, updating the database in small portions, and taking the database offline for a time to perform updates all suffer from poor performance, particularly when the database is large.

Thus, even using efficient modern database server applications, such as Microsoft® SQL Server™, updating a significant amount of data in a large, heavily utilized database can cause a greatly or completely degraded experience to the users of that database. For these reasons, the ability to publish large database updates to constantly accessed databases in a production environment is desired. Accomplishing timely data aggregation and large-scale publishing without causing service interruptions or incurring significant extra hardware or process costs is also desired.

SUMMARY OF THE INVENTION

The invention meets the above needs and overcomes one or more deficiencies in the prior art by providing improved data publishing of metadata to enhance user experience when playing various media, including CDs and DVDs. Advantageously, the present invention automatically maintains multiple live images of any large dataset and manages the data interface points in such a way that the transition is absolutely seamless to the users. Systems and methods of the invention make it easier to update an unused image behind the scenes while the other image is being accessed. Moreover, the features of the present invention described herein are less laborious and easier to implement than currently available techniques as well as being economically feasible and commercially practical.

Briefly described, a data publishing system embodying aspects of the invention includes at least two associated databases. One of the associated databases is online for delivering data to at least one recipient via a data communication network. Another one of the associated databases is offline to prevent data delivery. The system also includes back end and front end database servers. The back end database server collects source data and generates a current publication database from the collected source data. The back end database server also copies the current publication database to the offline database. The front end database server manages the online and offline databases and directs queries from the recipient to the online database for data retrieval. According to the invention, the front end database server further alternates the online and offline databases after the current publication database is copied to the offline database so that the offline database becomes online for data delivery and the online database becomes offline to prevent data delivery.

Another embodiment of the invention is directed to a method of managing and delivering data. The method includes maintaining at least two associated databases, enabling one of the associated databases for delivering data to at least one recipient via a data communication network, and disabling another one of the associated databases to prevent data delivery. The method further sets forth modifying the data contained in the disabled database and then alternating the enabled and disabled databases to enable the previously disabled database for data delivery and to disable the previously enabled database to prevent data delivery.

In another embodiment, a metadata publishing system includes a publication database containing a plurality of metadata records. The metadata records each relate to content of a media file adapted for rendering by a media player program executed on a client computer. A back end database server collects source data and generates the publication database from the collected source data. The system also includes at least two associated databases managed by a front end database server. One of the associated databases is online for delivery of metadata to at least one recipient via a data communication network and another one of the associated databases is offline to prevent delivery of data. The back end database server copies a current publication database to the offline database and the front end database server directs queries from the recipient to the online database for data retrieval. Then the front end database server further alternates the online and offline databases so that the offline database becomes online for delivery of metadata to the recipient and the online database becomes offline to prevent delivery of metadata to the recipient.

In yet another embodiment, a method embodying aspects of the invention manages and delivers metadata. The method includes collecting source data and generating a current publication database from the collected source data. The publication database contains metadata records that relate to content of media files adapted for rendering by a media player program. The method also includes maintaining at least two associated databases, enabling one of the associated databases for delivery of metadata to at least one recipient via a data communication network, and disabling another one of the associated databases to prevent delivery of metadata to the recipient. The method further includes copying the current publication database to the disabled database and then alternating the enabled and disabled databases to enable the previously disabled database for delivery of metadata and to disable the previously enabled database to prevent delivery of metadata.

An automated control database system of the invention includes a back end database server and an automation control database. The back end database server collects source data and generates a current publication database from the collected source data. The back end database server also copies the current publication database to one of at least two associated front end databases managed by a front end database server. One of the associated databases is online for delivery of data to at least one recipient via a data communication network. Another one of the associated databases is offline to prevent delivery of data. The back end server copies the current publication database to the offline database. The automation control database is managed by the back end database server and contains job control data for instructing the front end database server which of the associated databases is online and which of the associated databases is offline. The front end database server directs queries from the recipient to the online database for data retrieval and alternates the online and offline databases after the current publication database is copied to the offline database in response to the job control data.

Computer-readable media having computer-executable instructions for performing methods of processing media content embody further aspects of the invention.

Alternatively, the invention may comprise various other methods and apparatuses.

Other features will be in part apparent and in part pointed out hereinafter.

BRIEF DESCRIPTION OF THE DRAWINGS

FIG. 5 is a block diagram illustrating one example of a suitable computing system environment on which the invention may be implemented.

Corresponding reference characters indicate corresponding parts throughout the drawings.

DETAILED DESCRIPTION OF THE INVENTION

Figure 1:
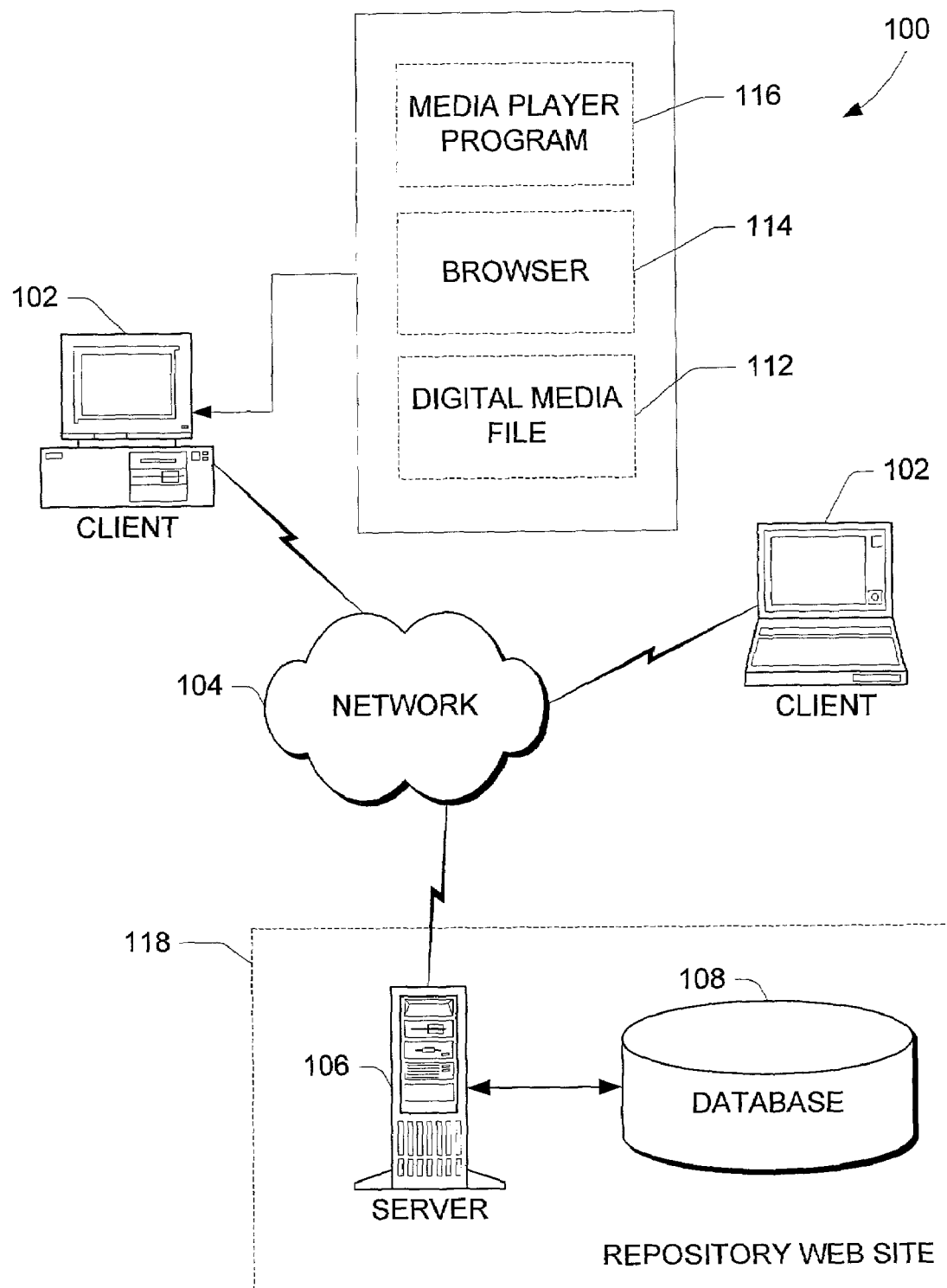
FIG. 1 is a block diagram of a computer system embodying aspects of the present invention.

Referring now to the drawings, FIG. 1 illustrates an exemplary network environment in which the present invention can be used. A system 100 has one or more client computers 102 coupled to a data communication network 104. One or more server computers 106, sometimes referred to as "web servers" or "network servers," are also coupled to the network 104. In turn, the client computer 102 can access the server 106 via network 104. As shown in FIG. 1, the system 100 also includes one or more databases 108 associated with server 106.

In this example, network 104 is the Internet (or the World Wide Web).

However, the teachings of the present invention can be applied to any data communication network. Server 106 and client computer 102 communicate in the illustrated embodiment using the hypertext transfer protocol (HTTP), a protocol commonly used on the Internet to exchange information.

Referring further to FIG. 1, the user's computer 102 accesses a digital media file 112, such as one residing on a compact disc (CD) or other suitable computer storage media. Client computer 102 also executes a web browser 114 and a media player application program 116. In this embodiment, server 106 and its associated database 108 form a repository web site 118 with which computer 102 communicates via network 104 to access data stored in database 108. The media player program 116 can be any suitable media player that is configured to play digital media so that a user can experience the content that is embodied on the media. For example, suitable media player applications include a CD media player application and a DVD media player application.

One aspect of the present invention enables the user or, particularly, enables media player program 116 executed on a computing device or client, to access, retrieve, and display for the user, so-called metadata. Those skilled in the art are familiar with metadata, which is simply information about data. In the context of the present invention, metadata includes information related to specific content of digital media file 112 being played on the media player 116. Basic metadata includes title, composer, performer, genre, description of content, and the like. Extended metadata includes cover art, performer biographies, reviews, related performers, where to buy similar items, upcoming concerts, ticket sales, URLs to other related experiences including purchase opportunities, and the like.

In the embodiment of FIG. 1, server 106 matches the metadata stored in database 108 to the specific media content that is being experienced by the user.

Server 106 then returns the metadata to the user's computer 102. It is to be understood that FIG. 1 presents a simplified illustration of the relationship between computer 102, server 106, and database 108. Aspects of the invention involving this relationship between the components will be described in greater detail below.

In the examples herein, the media content of digital media file 112 is described in the context of content embodied on a CD or a DVD. It is to be appreciated and understood that the media content can be embodied on any suitable media, including digital files downloaded to the client computer's memory, and that the specific examples described herein are given to further understanding of the inventive principles. For convenience, digital media file 112 refers to one or more files representing, for example, a single song track or a collection of tracks such as would be found on an audio CD. The media content can include, without limitation, specially encoded media content in the form of, for example, an encoded media file such as media content encoded in Microsoft® Windows Media™ format using the Microsoft® Windows Media™ Player program.

The resultant system 100 permits the user to play media file 112 on an enabled media-playing device (e.g., computer 102 running Microsoft® Windows® operating system and Windows Media™ Player) and expect not only to experience the media content but also have access to all manner of related metadata. In addition, the user community has the ability to contribute key information to the process to improve the experience for other users.

In an exemplary embodiment of the present invention, a web service (i.e., repository web site 118) provides data about music CDs and the like to media player application 116. Each time a user plays a CD, for example, in the media player, the media player contacts the web service to see what CD information (e.g., title, artist, cover art, track names, etc.) is available. The media player program 116 expects that 100% of the time, the user will see the correct information when he or she starts playing the CD.

On the back-end, the web service aggregates CD data from a number of different sources, including the user community. The data feeds vary periodically (e.g., daily). The process of collecting metadata is explained below in connection to FIG. 2. In this example, the web service publishes new CD information from different sources every day. Unfortunately, simply copying the new data out to the live server 106 will cause media player application 116 to slow down significantly and perhaps even fail to retrieve data from the web service during the process of copying the new data. Also, there is a risk that the player will get incomplete (and therefore incorrect) data for a given CD during the copying process. Neither case is acceptable to media player client 102.

According to the invention, system 100 schedules the copying activity in such a way to ensure that the user is always looking at a complete and current copy of the data. The media player users always get the desired CD information without the need for downtime each day during which the data is unavailable or potentially incorrect.

Figure 2:
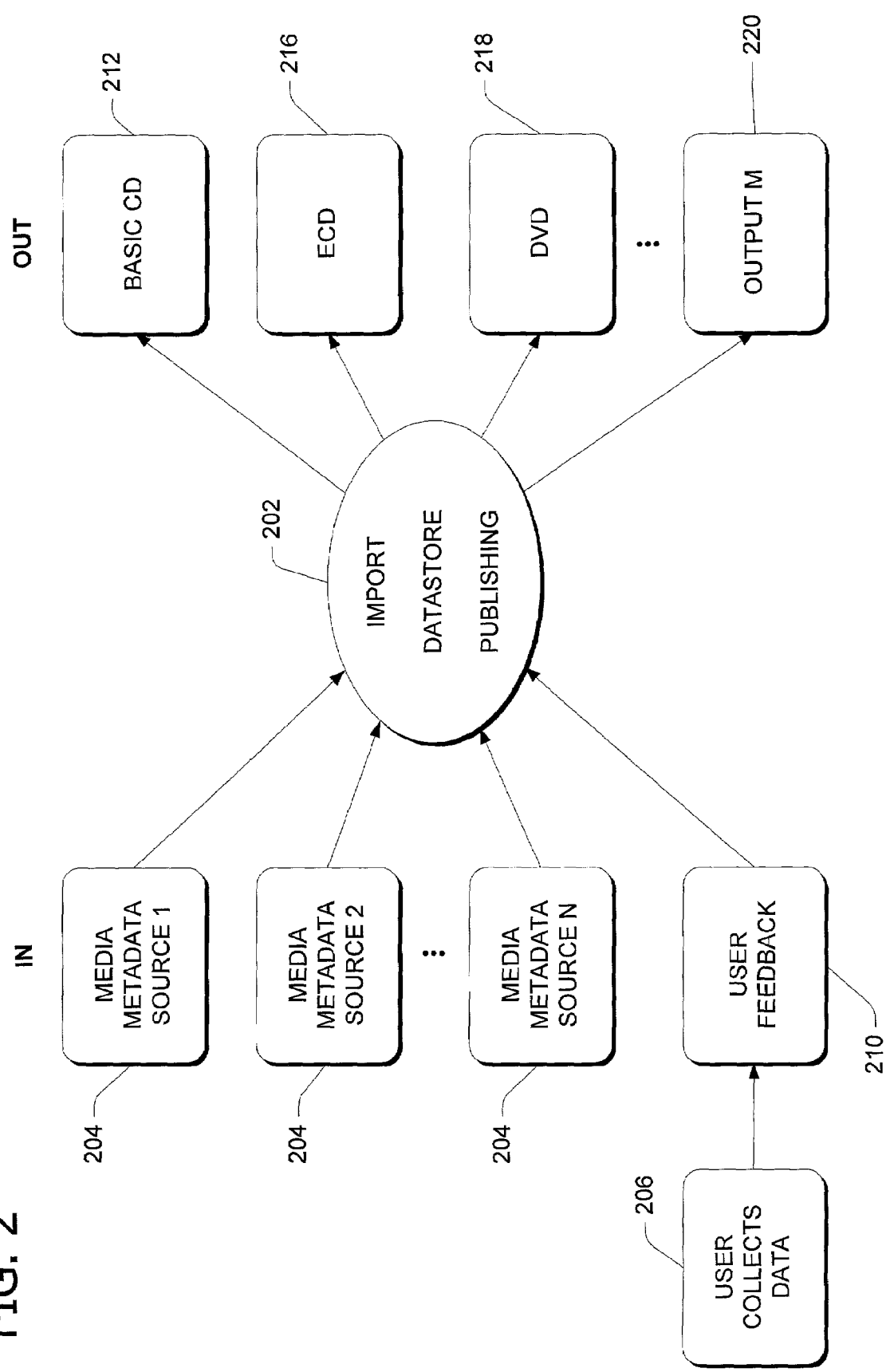
FIG. 2 is a block diagram illustrating aspects of metadata publishing by the system of FIG. 1.

Referring now to FIG. 2, one embodiment of repository web site 118 provides import, datastore, and publishing functions at 202. Typically, known data providers 204 of media metadata (e.g., AMG and Oricon) supply the repository with trusted information, that is, source data. In this instance, data providers 204 specialize in the gathering and management of media metadata and license the data to system 100. Due to the trusted nature of the source, this data is treated as "canonical." As an example, popular albums that have been released for many years tend to have well-established metadata.

Referring further to FIG. 2, the user gathers content-related media data directly from a CD, for example, at 206 and then submits the information at 210. In FIG. 2, system 100 publishes metadata in several formats. As shown at 212, published metadata takes the form of basic CD information. System 100 can also publish the data in extended CD format at 216 or DVD format at 218. As indicated at 220, the present invention contemplates other types of data output.

The present invention beneficially scales well to multiple data providers 204.

While basic metadata for each digital media type (e.g., CD, DVD) can be considered universal because they are tied to the data standards in the media, extended metadata varies widely among multiple data providers. Many data publishers require full updates of metadata on a regular basis. Thus, integrating multiple data sources into a single extended metadata schema necessitates the complete update of the entire data store each time any one provider refreshed its data set.

Figure 3:
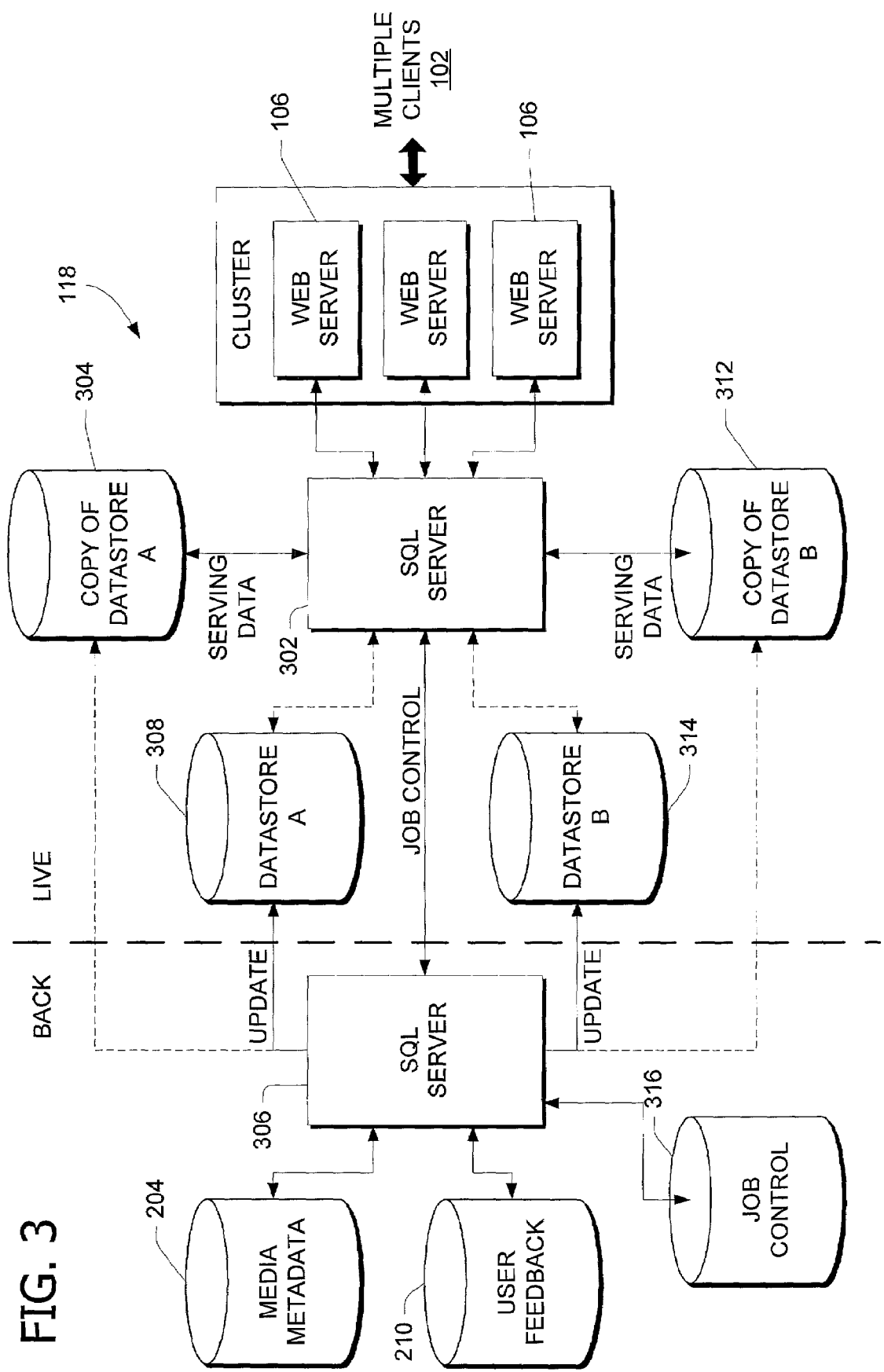
FIG. 3 is a block diagram illustrating aspects of metadata publishing and propagation by the system of FIG. 1.

Referring now to FIG. 3, the invention generally involves maintaining at least two copies of each database 108 that is currently published on a live, front end database server 302 embodied by, for example, a structured query language (SQL) server(s). The front end server 302 causes a first copy of each database, shown at 304, to serve the live query traffic while a back end database server 306, also illustrated as a SQL server(s), updates a second copy 308. When the second copy 308 is completely updated, server 302 redirects the live traffic to the data publication at the second copy 308 and it becomes the live database.

FIG. 3 also shows two copies 312,314 of another database. In this instance, front end database server 302 accomplishes switching in a similar manner.

The front end server 302 repeats the procedure periodically in response to job control data from the back end server 306. According to the invention, back end server 306 maintains a job control database 316 containing information about which of the database copies is live and which is available for updating. This keeps the live data regularly updated. Using a completely separate copy of the database to update offline, and then providing a mechanism for automatically switching all of the front end interfaces to the database after the updating is complete, provides a very efficient way to publish data.

Figure 4:
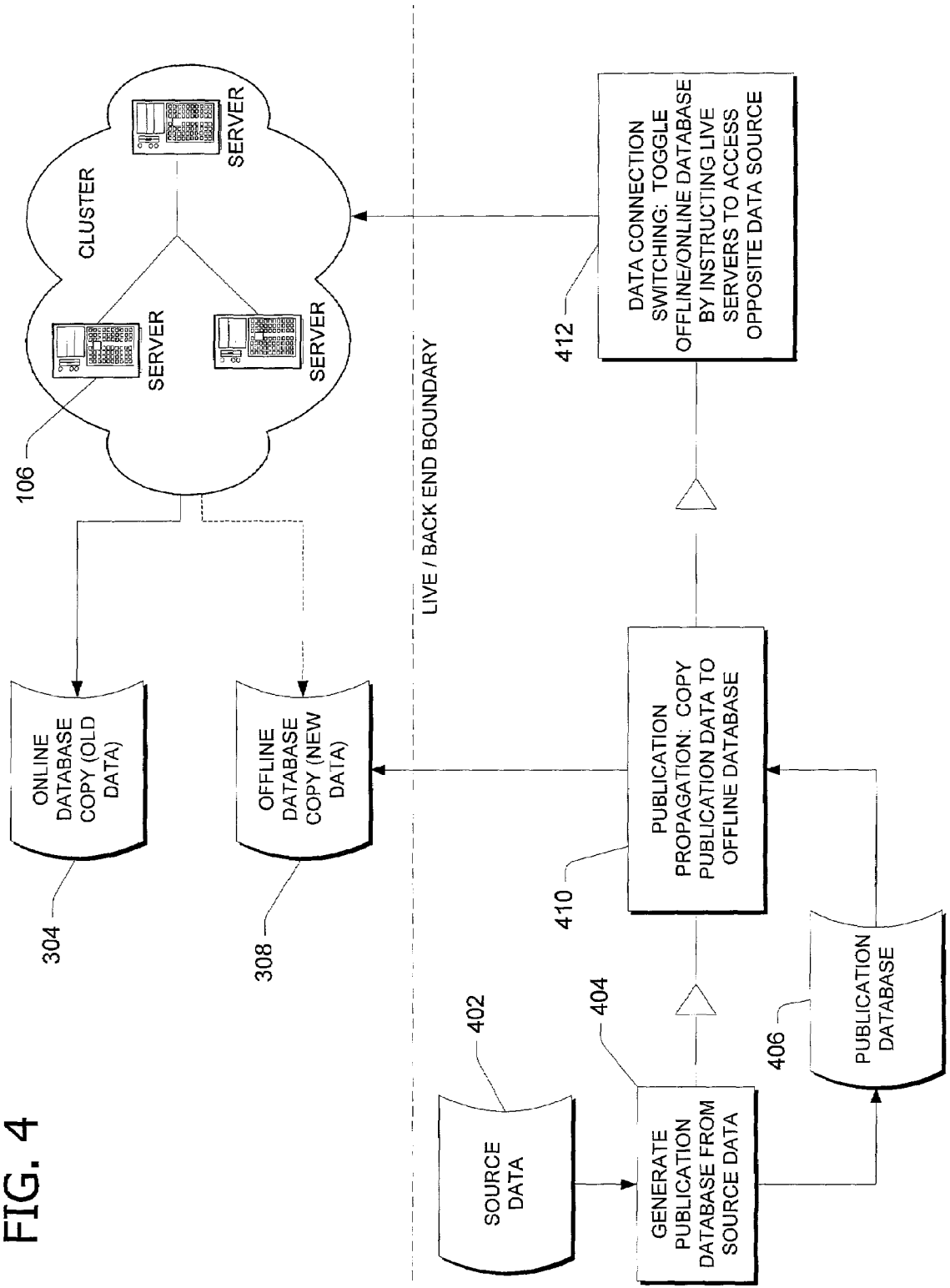
FIG. 4 is an exemplary flow diagram illustrating aspects of the operation of the system of FIG. 1.

FIG. 4 is an exemplary flow diagram that describes operations in accordance with one embodiment of the invention. The operations can be implemented in any suitable hardware, software, firmware or combination thereof. In the illustrated and described embodiment, the operations are implemented in software residing on the back end of the system. To this extent, FIG. 4 is divided into two different sections, namely, a front, or "live" end, and a back end.

The back end components of system 100 in one embodiment of the invention implement an automation control database, a publication process, a publication propagation process, and a task to redirect the live web servers 106. Beginning at 402 in FIG. 4, back end database server 306 collects source data (e.g., metadata relating to a plurality of music CDs). The job control, or automation control, database 316 on the local server (i.e., back end database server 306), logs appropriate job control data for later use by system 100.

At 404, back end server 306 also embodies a publication process, which creates a data publication 406 from the source data. This process 404 also logs status to automation control database 316. In this instance, the data publication 406, that is, the database to be published, constitutes the online database 304 or 312 in FIG. 3.

A set of publication propagation processes executed at 410 by back end server 306 move publication data 406 from the publication stage 404 to the live servers (e.g., web server 106) in a manner preserving transactional replication where appropriate. Those skilled in the art are familiar with replication concepts associated with relational database management system (RDBMS) software. For example, a database server application, such as Microsoft® SQL Server™, provides three common types of replication, namely, snapshot, transactional, and merge. Snapshot replication involves copying an entire view of data to another computer. In transactional replication, on the other hand, transactions executed on one computer are replicated to another computer. Transactional replication is helpful when incremental changes need to be propagated to subscribers as they occur. Merge replication, which allows various sites to work autonomously, involves updates on any computer that are replicated to another computer at a later time.

For the sake of efficiency, publication propagation process 410 uses bulk copying functions, such as those typically available for use with RDBMS servers, to move data publication 406 in this embodiment. Each publication propagation process 410 runs and moves the data to the live server(s) 106 via a consolidator. As before, publication propagation process 410 also logs status to automation control database 316. The set of publication propagation processes 410 are shown in FIG. 3 by updates to databases 308, 314. Moreover, the publication and propagation processes 404, 410 are shown generally at 202 in FIG. 2.

Referring now to data connection switching, shown at 412 in FIG. 4, back end server 306 carries out a task that redirects the live web servers 106 to use the new live publications. In other words, the task causes the online databases 304, 312 to be switched or alternated with the recently updated offline databases 308, 314. The data connection switching process 412 runs and switches pointers to all of the databases (e.g., databases 308, 314) that have passed publication propagation 410. This process 412 also logs status to automation control database 316. In one embodiment, a data connection switching subsystem in a server-side scripting environment code (e.g., Active Server Pages (ASP) available from Microsoft Corporation) implements the task for alternating the database connections (e.g., DSNs) used by the web pages to access data.

In one embodiment of the invention, back end server 306 executes the components, or processes, at 404,410,412 as scheduled tasks on a network server (e.g., Windows 2000 Server). It is to be understood that this server may be separate from or the same as back end database server 306. For simplicity, FIG. 3 illustrates the back end of the system having a single server 306. These processes use system-level commands on a consolidator to remove and re-establish transactional replication publications in real time. Limits on the processes include only running if each dependent publication staging process 404 has succeeded on its last run and only running if the data connection switching process 412 has succeeded on its last run. In this embodiment, the processes do not write a new value to the key-value control table until the replication snapshot is complete. Thus, the present invention provides a cascading-success system in which each step only runs if all dependent previous steps have succeeded. Additionally, each step makes use of table locking where appropriate to assure that no other step can overwrite data after the step has begun executing.

With respect to the task carrying out publication propagation 410, the present invention includes a set of jobs each of which begins with a server command file (e.g., NT CMD that is scheduled through the Task Scheduler). Publication propagation 410 begins logging the progress of the job to the local automation control database 316 and a text file. The publication propagation process 410 also calls some appropriate code package on an internal staging SQL-based server, for example, which performs numerous functions. These functions include checking to see whether all of the dependent publication processes 404 completed successfully on their last run (via standard stored procedure interface) and checking to see whether the data connection switching process 412 completed successfully on its last run (via standard store procedure interface). Back end database server 306 further establishes a table lock on all of the input publication tables, sets the appropriate key value in the uncommitted control table in the consolidator control database to NULL, reads the appropriate key value from the committed control table in the consolidator control database, and inverts the key value to determine the non-live database name. The set of publication propagation processes 410 also include dropping the replication publication and subscriptions on the consolidator for the appropriate database, bulk copying the publication data out to the appropriate consolidator database and establishing the transactional replication publication and subscriptions from the consolidator to the non-live database name. In this embodiment of the invention, publication propagation 410 further sets an execute-after-snapshot script that will update the appropriate key value in the uncommitted control table in the consolidator control database when the initial snapshot is complete and releases the table lock on the input tables. Following the set of publication propagation processes 410, a successful or failed completion is logged to local automation database 316.

In one embodiment of the present invention, data connection switching 412 also begins with a server command file (e.g., NT CMD file that is scheduled through the Task Scheduler) and includes logging the progress of the job to local automation control database 316 and a text file. The data connection switching task 412 also reads a list of live web servers 106 from a table and loops through each of the web servers to verify connectivity by checking the status of calling the data connection switching ASP code on each server. Any failure here raises an error and stops any further processing. Next, data connection switching 412 reads the uncommitted keys table. In this instance, null values in this table signals a long running or failed run of the propagation job 410 and raises an error in this package, although processing continues. Non-null values are updated in the uncommitted keys table for replication to the live, front end database server 302. The data connection switching job 412 updates values from uncommitted table to committed table and begins a loop with a timeout that continues the data connection switching ASP code on one of the web servers 106 until the output matches the values updated in the previous step. Expiration of the timeout period raises an error and stops any further processing. Next, data connection switching process 412 loops through each web server 106 again, calling the data connection switching ASP code in a set mode and records status of the call. Status errors raise an error in this package, meaning the server could not be set, but processing will continue. Following, data connection switching job 412 logs a successful or failed completion to local automation control database 316.

The data connection ASP code mentioned above is one example of a system of maintaining and using application scope variables to reference database pointers. As long as all of the ASP pages performing data access within the application reference the appropriate application scope variables before attempting to fetch data, they will always automatically be looking at the correct database.

The present invention takes into account the operational infrastructure of a data center in which the live machines running SQL Server, or the like, are physically isolated from the control network. The live end is accessible only via a "consolidator" machine that can communicate with both the live machines and the control network. For this reason, there is an extra level of abstraction control in the implementation.

Referring again to FIG. 1, various features of the described systems and methods include a set of databases, client side executable code, and a series of server side processes that provide for querying and maintaining the databases. One logical organization of exemplary system 100 includes a process to map a piece of physical media (embodied by digital media file 112) to a unique database key or, as referred to herein, a "logical ID." This organization also includes a query process to retrieve information from database 108 based on the unique database key or logical ID. A data return mechanism and schema set returns data and a user feedback system allows users to contribute to the set of understood keys or logical IDs. The logical organization of system 100 also includes a set of management processes that handle user contributions.

The following sets forth a description of exemplary query processes according to the invention. In system 100, the user on the client side inserts the media into computer 102, or otherwise causes the content of media file 112 to be experienced. Computer 102 uses a physical ID identifying specific media file 112 to access the logical ID that uniquely identifies the media. Server 106 then uses the logical ID as the basis for metadata queries of database 108. These queries are designed to retrieve a rich set of related metadata for the user. Server 106 then returns the metadata to client computer 102 via network 104 for display to the user.

When the user accesses ("rips") an audio track from a specific digital medium, the ripped track (i.e., digital media file 112) is stored on local storage media associated with the user's computer, such as client computer 102 in FIG. 1 (see also computer 70 in FIG. 5). If client computer 102 is connected to network 104, as described with reference to FIG. 1 and FIG. 5, media player program 116 executing on computer 102 sends an identifier for digital media file 112 to server 106 of repository web site 118 via network 104. As described above, the identifier may take the form of a physical ID such as a table of contents (TOC) identifying the specific digital media file 112 based on the offsets of each track on the disc. The TOC, defined by a well-known specification referred to as the Red Book, identifies an audio CD based on absolute times for the start of each track. The TOC, found in the CD's lead-in area, is expected to be the same for all like-entitled CDs published from the same source. Repository web site 118 has access to database 108. In response to the received TOC (or the mapped logical ID), server 106 transmits metadata associated with the identified media file 112 to the user's computer 102.

In one described embodiment, each media file 112 in which the content that is to be experienced by the user resides has a physical ID associated therewith. The physical ID is assigned or otherwise associated with a logical ID, which is then used as the basis for any database queries. With respect to the physical IDs that are associated with the media, any suitable method or technique of generating a physical ID can be used. For example, when a user inserts a piece of media into a properly configured and enabled device, software code can execute and read data from the physical media. The software code can then compose a unique or nearly unique physical ID from that data.

In the case where the media comprises a CD, the software code can read the offsets (in frames, which have a resolution of $\frac{1}{72}^{nd}$ of a second) of each track on the disc. A composite key or physical ID is then built from a string of the hex values of these offsets, prefaced by a number of tracks on the disc and finished with a representation of the total length of the disc.

In the case where the media comprises a DVD, the software code can read the first 64 kilobytes of two files that are guaranteed to be on every DVD. These files are VIDEO_TS.IFO and VTS_01_0.IFO. The former contains main-menu information (VMGI), and the latter contains title set information (VTSI) for the first title on the DVD. After the appropriate data blocks are read, the code generates a 64-bit CRC (cyclic redundancy code) checksum of the data, resulting in an appropriately unique key or physical ID. Of course, it is to be understood that the above two examples are simply two ways that a physical ID can be generated for two different types of media. Other methods of generating physical IDs, as well as other media types can be employed.

Calculation of the physical IDs takes place, in this example, on the client side by software code that executes on client computer 102. Such code can comprise part of a software-implemented media player (e.g., media player program 116) that is configured to play the media of interest. Once the physical IDs are generated, client computer 102 sends the physical IDs to server 106 of the repository web site 118 via network 104 using a suitable protocol. The server 106 then uses the physical ID to query a lookup table to determine whether there is a proper logical ID associated with it. The logical ID represents the piece of media in metadata database 108. If there is a logical ID associated with the physical ID, then that logical ID serves as a basis for a query of database 108. This query then returns, to the user, metadata associated with the user's media file 112. This metadata comprise a rich collection of data, with non-limiting examples being given above.

FIG. 5 shows one example of a general purpose computing device in the form of a computer 500. In one embodiment of the invention, a computer such as the computer 500 is suitable for use in executing media player program 116.

In the illustrated embodiment, computer 500 has one or more processors or processing units 502 and a system memory 504. A system bus 508 couples various system components including the system memory 504 to the processors 502. The bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 500 has at least some form of computer readable media in FIG. 5. Computer readable media may be any available medium that can be accessed locally or remotely by computer 500. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 500. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic. RE, infrared, and other wireless media, are examples of communication media. Combinations of the any of the above are also included within the scope of computer readable media.

The system memory 504 includes computer storage media in the form of removable and/or non-removable, volatile and/or nonvolatile memory. In the illustrated embodiment, system memory 504 includes read only memory (ROM) 510 and random access memory (RAM) 512. A basic input/output system 516 (BIOS), containing the basic routines that help to transfer information between elements within computer 500, such as during startup, is typically stored in ROM 510. The RAM 512 typically contains data and/or program modules that are immediately accessible to and/or presently being operated on by processing unit 502. By way of example, and not limitation, FIG. 5 illustrates operating system 518, application programs 520 (e.g., media player 116), other program modules 524, and program data 526.

The computer 500 may also include other removable/non-removable, volatile/nonvolatile computer storage media. For example, FIG. S illustrates a hard disk drive 530 that reads from or writes to non-removable, nonvolatile magnetic media. FIG. 5 also shows a magnetic disk drive 532 that reads from or writes to a removable, nonvolatile magnetic disk 534, and an optical disk drive 536 that reads from or writes to a removable, nonvolatile optical disk 538 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, arid the like. The hard disk drive 530, and magnetic disk drive 532 and optical disk drive 536 are typically connected to the system bus 508 by a non-volatile memory interface, such as interface 542.

The drives or other mass storage devices and their associated computer storage media discussed above and illustrated in FIG. 5, provide storage of computer readable instructions, data structures, program modules and other data for the computer 500. In FIG. 5, for example, hard disk drive 530 stores operating system 546, application programs 548, other program modules 550, and program data 552. Note that these components can either be the same as or different from operating system 518, application programs 520, other program modules 524, and program data 526. Operating system 546, application programs 548, other program modules 550, and program data 552 are given different numbers here to illustrate that, at a minimum, they are different copies.

For purposes of illustration, programs and other executable program components, such as the operating system 518, 546, are illustrated herein as discrete blocks. It is recognized, however, that such programs and components reside at various times in different storage components of the computer, and are executed by the data processor(s) of the computer. For example, FIG. 5 shows media player 116 stored in system memory 504. Those skilled in the art understand that components of media player 116 may reside in system memory 504, hard disk drive 530, or both.

Referring further to FIG. 5, a user may enter commands and information into computer 500 through input devices such as a keyboard 556 and a pointing device 558 (e.g., a mouse, trackball, pen, or touch pad). Other input devices known in the art include an audio/video input device(s) 560 as well as a microphone, joystick, game pad, satellite dish, scanner, or the like (not shown). These and other input devices are connected to processing unit 502 through a user input interface 564 that is coupled to system bus 508, but may be connected by other interface and bus structures, such as a parallel port, game port, or a universal serial bus (USB). As is well known in the art, application programs 520, 548 are often configured to present a user interface (UI). The UI allows a user to interact with the application program in some manner using some type of input device (e.g., keyboard 556 or pointing device 558). This UI is typically a visual display that is capable of receiving user input and processing that user input in some way. By way of example, the UI presents one or more buttons or controls that can be clicked on by a user.

A monitor 566 or other type of display device is also connected to system bus 508 via an interface, such as a video interface 568. In addition to the monitor 566, computers often include other peripheral output devices (not shown) such as a printer and speakers, which may be connected through an output peripheral interface (not shown).

The computer 500 may operate in a networked environment using logical connections to one or more remote computers, such as a remote computer 572. The remote computer 572 may be a personal computer, a server, a router, a network PC, a peer device or other common network node, and typically includes many or all of the elements described above relative to computer 500. The logical connections depicted in FIG. 5 include a local area network (LAN) 574 and a wide area network (WAN) 576, but may also include other networks. Such networking environments are commonplace in offices, enterprise-wide computer networks, intranets, and global computer networks (e.g., the Internet).

When used in a local area networking environment, computer 500 is connected to the LAN 574 through a network interface or adapter 580. When used in a wide area networking environment, such as the Internet, computer 500 typically includes a modem 582 or other means for establishing communications over the WAN 576. The modem 582, which may be internal or external, is connected to system bus 508 via the user input interface 564, or other appropriate mechanism. In a networked environment, program modules depicted relative to computer 500, or portions thereof, may be stored in a remote memory storage device (not shown). By way of example, and not limitation, FIG. 5 illustrates remote application programs 584 as residing on the memory device. It will be appreciated that the network connections shown are exemplary and other means of establishing a communications link between the computers may be used.

Generally, the data processors of computer 500 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

Although described in connection with an exemplary computing system environment, including computer 500, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 500 executes computer-executable instructions such as those illustrated in FIG. 4. Back end database server 306 collects source data, such as media metadata, and generates a current publication database from the collected source data. The publication database contains, for example, a plurality of metadata records that relate to the content of one or more media files 112. As described above, media files 112 are adapted for rendering by media player program 116 executed on client computer 102. Front end database server 302 maintains at least two associated databases 304, 308 (or 312, 314). The present invention enables one of the associated databases, such as database 304, for delivering data to at least one recipient (e.g., web server 106) via data communication network 104. In other words, the database is online. According to the invention, the other database 308 is offline, or disabled, to prevent data from being delivered to the recipient. Back end database server 306 modifies the data contained in the disabled database 308 while it is offline and then instructs front end database server 302 to alternate the enabled database 304 with the recently updated disabled database 308. This enables the previously disabled database for delivering data and disables the previously enabled database to prevent it from delivering data. In one embodiment, back end database server 306 modifies the data in the offline database by copying the current publication database to it.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A data publishing system comprising:
at least two associated databases, one of said associated databases being online for delivery of data therefrom to at least one recipient via a data communication network, another one of said associated databases being offline to prevent delivery of data therefrom to the recipient via the data communication network, said at least one recipient comprising a network server coupled to the data communication network;
a back end database server for collecting source data and generating a current publication database from the collected source data, said back end database server copying the current publication database to the offline database, said current publication database containing a plurality of metadata records, said metadata records each relating to content of one or more media files, said media files being adapted for rendering by a media player program executed on a client computer coupled to the data communication network;
a front end database server for managing the online and off line databases, said front end database server directing queries from the recipient to the online database for data retrieval, said front end database server further alternating the online and offline databases after the current publication database is copied to the offline database so that the offline database becomes online for delivery of data therefrom to the recipient and the online database becomes offline to prevent delivery of data therefrom to the recipient; and
an automation control database managed by the back end database server, said automation control database containing job control data for instructing the front end database server which of the associated databases is online and which of the associated databases is offline.

2. The system of claim 1 wherein the front end database server is responsive to job control data from the back end database server for alternating the online and offline databases.

3. The system of claim 2 wherein the job control data is representative of which of the associated databases contains the current publication database.

4. The system of claim 1 wherein the current publication database includes one or more updated records from a past publication database.

5. The system of claim 4 wherein the offline database comprises a copy of the online database prior to having the current publication database copied thereto.

6. The system of claim 1 wherein said network server is configured to receive an identifier representative of a specific media file being rendered by the media player program on the client computer and to query the online database for one or more metadata records corresponding to the specific media file as a function of the identifier, said network server receiving the identifier from the client computer via the data communication network.

7. The system of claim 6 wherein the network server retrieves the metadata record found in the online database that corresponds to the specific media file represented by the identifier, formats the retrieved metadata record for rendering by the media player program, and delivers the formatted metadata record to the client computer via the data communication network for rendering with the corresponding specific media file.

8. The system of claim 6 wherein the identifier is configured for use in querying the online database.

9. The system of claim 1 wherein the source data includes a plurality of metadata entries provided via the network server by one or more users of the media player program on the client computer, said metadata entries each corresponding to a specific media file and relating to the content of the corresponding specific media file.

10. The system of claim 1 wherein the front end database server comprises a relational database management system server.

11. The system of claim 1 wherein the back end database server comprises a relational database management system server.

12. The system of claim 11 wherein the back end database server performs a bulk copying function to move the current publication data to the offline database.

13. The system of claim 1 wherein the back end database server executes computer-executable instructions for scheduling a task to cause the front end database server to alternate the online and offline databases and to redirect queries of the recipient from a past data publication contained in the previously online database to the current data publication contained in the newly online database.

14. The system of claim 1 wherein the front end and back end database servers are physically isolated from each other.

15. The system of claim 1 wherein the back end database server executes computer-executable instructions defining application scope variables to reference database pointers for use in directing the recipient to the online database before attempting to retrieve data.

16. A method of managing and delivering data via a network server coupled to a data communication network, said data being delivered in response to a query from a client computer, said client computer executing a media player program adapted for rendering media files, said method comprising:
    collecting source data;
    generating a current publication database from the collected source data, said publication database containing a plurality of metadata records, said metadata records each relating to content of one or more media files, said media files being adapted for rendering by the media player program executed on the client computer;
    maintaining at least two associated databases including the current publication database;
    enabling one of said associated databases for delivery of metadata therefrom to at least one network server via the data communication network;
    disabling another one of said associated databases to prevent delivery of metadata therefrom to the network server via the data communication network;
    modifying the metadata contained in the disabled database;
    managing the associated databases with a front end database server;
    maintaining an automation control database managed by a back end database server, said automation control database containing job control data for instructing a front end database server which of the associated databases is enabled and which of the associated databases is disabled; and
    alternating the enabled and disabled databases after the metadata in the disabled database is modified to enable the previously disabled database for delivery of metadata therefrom to the network server and to disable the previously enabled database to prevent delivery of metadata therefrom to the network server.

17. The method of claim 16 wherein modifying the metadata contained in the disabled database comprises copying the current publication database to the disabled database.

18. The method of claim 16 wherein the current publication database includes one or more updated records from a past publication database.

19. The method of claim 18 wherein the disabled database comprises a copy of the enabled database prior to having the current publication database copied thereto.

20. The method of claim 16 further comprising receiving, by the network server, an identifier representative of a specific media file being rendered by the media player program on the client computer and querying the enabled database for one or more metadata records corresponding to the specific media file as a function of the identifier, said network server receiving the identifier from the client computer via the data communication network.

21. The method of claim 20 further comprising retrieving, by the network server, the metadata record found in the enabled database that corresponds to the specific media file represented by the identifier, formatting the retrieved metadata record for rendering by the media player program, and delivering the formatted metadata record to the client computer via the data communication network for rendering with the corresponding specific media file.

22. The method of claim 20 wherein the identifier is configured for use in querying the enabled database.

23. The method of claim 16 wherein the source data includes a plurality of metadata entries provided via the network server by one or more users of the media player program on the client computer, said data entries each corresponding to a specific media file and relating to the content of the corresponding specific media file.

24. The method of claim 16 wherein managing the associated databases comprises directing queries from the network server to the enabled database for data retrieval.

25. The method of claim 16 wherein the front end database server is responsive to job control data from a back end database server for alternating the associated databases.

26. The method of claim 25 wherein the job control data is representative of which of the associated databases contains a current publication database after the data in the disabled database is modified.

27. The method of claim 16 wherein the back end database server comprises a relational database management system server.

28. The method of claim 27 further comprising performing a bulk copying function to modify the disabled database.

29. The method of claim 16 further comprising scheduling a task, by the back end database server, to cause the front end database server to alternate the enabled and disabled databases and to redirect queries of the network server from a past data publication contained in the previously enabled database to a current data publication contained in the newly enabled database.

30. The method of claim 16 further comprising physically isolating the front end and back end database servers from each other.

31. The method of claim 16 further comprising defining application scope variables, by the back end database server, to reference database pointers for use in directing the recipient to the enabled database before attempting to retrieve data.

32. The method of claim 16 wherein the front end database server comprises a relational database management system server.

33. The method of claim 16 wherein one or more computer-readable media have computer-executable instructions for performing the method of claim 16.

34. An automated control database system comprising:

a back end database server for collecting source data and generating a current publication database from the collected source data, said current publication database containing a plurality of metadata records, said metadata records each relating to content of one or more media files, said media files being adapted for rendering by a media player program executed on a client computer, said back end database server copying the current publication database to one of at least two associated front end databases managed by a front end database server, one of said associated front end databases being online for delivery of metadata therefrom to at least one recipient via a data communication network, another one of said associated front end databases being offline to prevent delivery of metadata therefrom to the recipient via the data communication network, said current publication database being copied to the offline database; and an automation control database managed by the back end database server, said automation control database containing job control data for instructing the front end database server which of the associated databases is online and which of the associated databases is offline, said front end database server directing queries from the recipient to the online database for data retrieval, said front end database server receiving and responsive to the job control data for alternating the online and offline databases after the current publication database is copied to the offline database so that the offline database becomes online for delivery of metadata therefrom to the recipient and the online database becomes offline to prevent delivery of metadata therefrom to the recipient.

35. The system of claim 34 wherein the job control data is representative of which of the associated databases contains the current publication database.

36. The system of claim 34 wherein the current publication database includes one or more updated records from a past publication database.

37. The system of claim 34 wherein the back end database server comprises a relational database management system server.

38. The system of claim 37 wherein the back end database server performs a bulk copying function to move the current publication data to the offline database.

39. The system of claim 34 wherein the back end database server executes computer-executable instructions for scheduling a task to cause the front end database server to alternate the online and offline databases and to redirect queries of the recipient from a past data publication contained in the previously online database to the current data publication contained in the newly online database.

40. The system of claim 34 wherein to back end database server executes computer-executable instructions defining application scope variables to reference database pointers for use in directing the recipient to the online database before attempting to retrieve data.

* * * * *